(12) United States Patent
Sana et al.

(10) Patent No.: US 11,388,732 B2
(45) Date of Patent: Jul. 12, 2022

(54) METHOD FOR ASSOCIATING USER EQUIPMENT IN A CELLULAR NETWORK VIA MULTI-AGENT REINFORCEMENT LEARNING (71) Applicant: COMMISSARIAT A L'ENERGIE ATOMIQUE ET AUX ENERGIES ALTERNATIVES, Paris (FR)

(72) Inventors: Mohamed Sana, Grenoble (FR); Antonio De Domenico, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 1 day.

(21) Appl. No.: 17/099,922

(22) Filed: Nov. 17, 2020

(65) Prior Publication Data
US 2021/0153219 A1 May 20, 2021

(30) Foreign Application Priority Data
Nov. 19, 2019 (FR) ..................................... 19 12906

(51) Int. Cl.
| | | |
|---|---|---|
| *H04W 24/02* | (2009.01) | |
| *H04W 72/08* | (2009.01) | |
| *G06N 3/08* | (2006.01) | |
| *H04W 28/16* | (2009.01) | |
| *H04W 84/04* | (2009.01) | |

(Continued)

(52) U.S. Cl.
CPC ............ *H04W 72/087* (2013.01); *G06N 3/08* (2013.01); *H04W 24/02* (2013.01); *H04W 28/16* (2013.01); *H04W 84/042* (2013.01); *H04W 88/02* (2013.01); *H04W 88/08* (2013.01)

(58) Field of Classification Search
CPC ...... H04W 24/02; H04W 28/16; H04W 72/08
See application file for complete search history.

(56) References Cited

U.S. PATENT DOCUMENTS

| | | | | |
|---|---|---|---|---|
| 2016/0373954 | A1* | 12/2016 | Usui ..................... | H04L 47/263 |
| 2020/0090074 | A1* | 3/2020 | Isele ..................... | G06F 30/20 |
| 2020/0320397 | A1* | 10/2020 | Liu ..................... | H04L 41/5019 |

OTHER PUBLICATIONS

U.S. Appl. No. 16/681,973, filed Nov. 13, 2019, 2020/0162930 A1, Miscopein, B, et al.

(Continued)

*Primary Examiner* — Michael T Vu
(74) *Attorney, Agent, or Firm* — Oblon, McClelland, Maier & Neustadt, L.L.P.

(57) ABSTRACT

A method for associating user equipment with base stations of a cellular network such as a 5G network. An agent receives an observation of its environment and deduces an action therefrom, this action being manifested as an association request of the user to a neighboring base station. This action is chosen according to a strategy of the user seeking the maximum of a function of action value for the observation and several possible actions. Once the actions have been carried out by the various actions, a common reward is provided by the network to the various users, the latter being zero in the case of a collision of association requests and the result of a utility function otherwise. The function of action value for the various possible actions is predicted by a recurrent neural network trained on a set of experiments stored in a local memory.

12 Claims, 6 Drawing Sheets

(51) Int. Cl.
    *H04W 88/02*  (2009.01)
    *H04W 88/08*  (2009.01)

(56) References Cited

OTHER PUBLICATIONS

U.S. Appl. No. 17/064,736, filed Oct. 7, 2010, De Domenico, A, et al.
U.S. Appl. No. 17/064,761, filed Oct. 7, 2020, De Domenico, A, et al.
French Preliminary Search Report dated Aug. 4, 2020 in French Application 19 12906 filed on Nov. 19, 2019 (wioth English Translation of Categories of Cited Documents & Written Opinion), 13 pages.
Zhao et al., "Deep Reinforcement Learning for User Assocition and Resource Allocation in Heterogeneous Cellular Networks", IEEE Transactions on Wireless Communications, vol. 18, No. 11, XP055718441, Nov. 2019, pp. 5141-5152.
Oroojlooyjadid et al., "A Review of Cooperative Multi-Agent Deep Reinforcement Learning", XP081459916, Aug. 11, 2019, 33 pages.
Hernandez-Leal et al., "A survey and critique of multiagent deep reinforcement learning", Autonomous Agents and Multi-Agent Systems, vol. 33, No. 6, XP036911160, Oct. 16, 2019, pp. 750-797.
Arulkumaran et al., "A Brief Survey of Deep Reinforcement Learning", IEEE Signal Processing Magazine, Special Issue on Deep Learning for Image Understanding (ARXIV Extended Version), XP055447489, 16 pages, Sep. 28, 2017.
Watkins et al., "Q-Learning", Machine Learning, vol. 8, No. 3-4, 1992, pp. 279-292.
Sutton et al., "Reinforcement Learning", $2^{nd}$ edition, 2018, pp. 129-132.
Rusu et al., "Policy Distillation", Under review as a conference paper at ICLR 2016, arXiv: 1511,06295v2, Jan. 7, 2016, 13 pages.
Mnih et al., "Human-level control through deep reinforcement learning", Nature, vol. 518, Feb. 26, 2015, pp. 529-541.

\* cited by examiner

METHOD FOR ASSOCIATING USER EQUIPMENT IN A CELLULAR NETWORK VIA MULTI-AGENT REINFORCEMENT LEARNING

TECHNICAL FIELD

The present invention relates to the field of cellular networks and more particularly to the association of user equipment (UE) with base stations in a heterogeneous network such as those of the fifth generation (5G). It also relates to the field of artificial intelligence and more particularly that of Multi-Agent Reinforcement Learning or MARL.

Prior Art

The methods for association of mobile terminals or UE (User Equipment) with the base stations of a cellular network have been the subject of vast research over the last twenty years. In general, an association method aims to determine, for each mobile terminal, the base station (in other words the cell) that will have to serve it, given the needs of all the users (bandwidth, signal-to-noise ratio, latency, etc.) and the constraints relative to the base stations (maximum emission power, level of interference, etc.). A wide diversity of association methods has been proposed in the prior art, according to the target function to be achieved and the constraints to be met.

With the deployment of $5^{th}$ generation cellular networks, the association techniques must evolve to face new challenges. Indeed, 5G networks are heterogeneous by nature, because of the superposition of a dense layer of small cells or SBSs (Small-cell Base Stations) operating in particular in the millimeter band, intended to ensure coverage over a small distance and at high bandwidth, and of a not very dense layer of macrocells or MBSs (Macro-cell Base Stations), operating in the sub-6 GHz band, intended to ensure continuous coverage. The small cells have available a large number of transmission resources whether in terms of spectral resources or spatial resources (formation of directional beams). Moreover, the association of a mobile terminal with a base station (SBS or MBS) requires taking into account the load of the various base stations, the levels of interference, the bandwidths of the various users, the possible configurations of beams, etc. As a result, the optimization of the overall performance of the network becomes particularly complex. It can be shown that the search for the optimal association is in fact a combinatorial problem, the complexity of which is of the NP class, in other words, having a complexity that changes exponentially with the number of users in the network.

A method for associating mobile terminals with base stations of a heterogeneous network was described in the article by N. Zhao et al. entitled "Deep reinforcement learning for user association and resource allocation in heterogeneous networks" published in Proc. of IEEE Global Communications Conference (GLOBECOM), pp. 1-6, 2018. This association method relies on a reinforcement learning method known by the name of Q-learning. A description of this method can be found in the article by C. Watkins et al. entitled "Q-learning" published in the review Machine Learning, vol. 8, No. 3-4, pp. 279-292, 1992. It is recalled that a reinforcement learning method is a machine learning method in which an autonomous agent, immersed in an environment, learns actions to be carried out on the basis of experiments, in such a way as to optimize a reward accumulated over time. The agent takes decisions according to its current state and the environment provides it with rewards according to the actions that it carries out. In the aforementioned article, the association method is of the multi-agent type, each user equipment acting as an agent and learning from its environment, the various agents operating cooperatively. However, this association method uses a space of states representing the satisfaction (or absence of satisfaction) of a minimum quality of service (QoS) (2) for each of the users of the network, each user being moreover informed of the satisfaction or not of the qualities of service requested by the other users. This type of cooperation supposes the exchange of a significant number of messages (message passing) between the mobile terminals via control channels and thus the mobilization of transmission resources for this purpose. Moreover, the determination of the association policy supposes the use of a DDQN neural network (Double Deep Q-network), the size of the input variables of which increases with the number of users. As a result, the association method proposed is not scalable with the number of users in the network. In this case, if a user rejoins or leaves a cell, this implies a modification of the architecture of the neural network of each of the users.

One object of the present invention is consequently to propose a method for associating user equipment with base stations of a cellular network, in particular a heterogeneous network such as a 5G network, implementing a multi-agent reinforcement learning algorithm, which does not require an exchange of messages between users and which is scalable with regard to both the number of users and the number of base stations in the network.

DISCLOSURE OF THE INVENTION

The present invention is defined by a method for associating pieces of user equipment (UEs) with base stations of a cellular network, said association method implementing a multi-agent reinforcement learning method, an agent being associated with each user equipment, said association method being particular in that:

each user equipment $u_j$ determines a set $S_j$ of base stations in the coverage of each of which it is located;

each agent associated with a user equipment selects, on the basis of a partial observation ($o_j(t)$) of its environment at a given time, an action ($a_j(t)$) out of a plurality of possible actions, each possible action corresponding to a request to associate the user equipment with a base station ($BS_i \in S_j$) of said set, said action being selected on the basis of a strategy ($\pi_j$) aiming to maximize an action value calculated as the expected sum of a plurality of future rewards, updated at said given time, the user equipment transmitting to a central controller an association request corresponding to the action thus selected;

each base station determines whether it can satisfy all of the association requests received from the UEs given the transmission resources that it has available and in the negative case informs the central controller thereof;

the central controller calculates a reward ($r(t)$), common to the actions of the agents, and broadcasts it to all the UEs, this reward being zero if one of the base stations cannot satisfy all of the association requests received and equal to the value taken by a utility function of the network, representative of the quality of service provided to the UEs, otherwise.

According to a first alternative, the utility function $U(t)$ of the network is equal to the sum of the capacities of the downlinks between the UEs and the base stations that are associated with it or to the sum of the logarithms of these capacities.

According to a second alternative, the utility function of the network is equal to $$U(t) = \sum_{i,j} x_{ij} \min(D_j, R_{ij})$$

where $D_j$ is the bandwidth requested by a user equipment $u_j$ and $R_{ij}$ is the capacity of the downlink between the base station $BS_i$ and the user equipment $u_j$, $x_{ij}=1$ if the base station $BS_i$ is associated with the user equipment $u_j$ and $x_{ij}=1$ otherwise.

The cellular network can typically be a heterogeneous network consisting of a layer of macrocells and a layer of small cells, the central controller thus being located in the base station of a macrocell.

According to a first embodiment, the agent associated with a user equipment $u_j$ predicts the action values of the various possible actions via a recurrent artificial neural network (DRQN) receiving at the input a vector of observation of the environment $o_j(t)$ at a given time and providing at the output a prediction of the action values for the various possible actions corresponding to the base stations of the set $S_j$.

The neural network typically comprises an input layer, a first plurality of densely connected layers, an LSTM layer, a second plurality of densely connected layers and an output layer.

Advantageously, the vector of observation of the environment comprises the action $a_j(t-1)$ having been carried out by the user equipment $u_j$ at the preceding time; the response $ACK_j(t-1)$ to the association request, sent back by the base station to which it was transmitted; a measurement of the power received from the base station at the given time t, $RSSI_j(t)$; the bandwidth $D_j(t)$ requested by the mobile terminal at the time t, an estimation $R_j(t-1)$ of the channel capacity of the downlink at the preceding time t−1; an estimation $R(t-1)$ of the sum of the capacities of the downlinks of UEs at the preceding time.

The recurrent neural network can thus be trained on a set of experiments $e_j(t)=(o_j(t),a_j(t),r_j(t),o_j(t+1))$, each experiment belonging to an episode, $\{e_j(t); t=1, \ldots, T\}$, an experiment being defined as a quadruplet consisting of the observation vector $o_j(t)$ at the given time t, the action $a_j(t)$ selected by the agent at this time, the reward received from the controller after this action, and an observation vector, $o_j(t+1)$, at the following time, said experiments being stored in a local memory $M_j$ of the user equipment $u_j$.

According to a first alternative, the synaptic coefficients of the recurrent neural network are represented by a parameter vector, $\theta_j$, said parameter vector being obtained by a stochastic gradient descent on a loss function averaged by mini-batch $L_j(\theta_j)=E_{e_j^b(t)\square B_j}([\delta_j^b(t)]^2)$ where $\delta_j^b(t)$ is a TD error in the prediction of action value for an experiment of the mini-batch.

According to a second alternative, the synaptic coefficients of the recurrent neural network are represented by a parameter vector, $\theta_j$, said parameter vector being obtained by a stochastic gradient descent on a loss function averaged by mini-batch $L_j(\theta_j)=E_{e_j^b(t)\square B_j}([w_j^b\delta_j^b(t)]^2)$ where $\delta_j^b(t)$ is a TD error in the prediction of action value for an experiment of the mini-batch and $w_j^b=\chi$ if the TD error is positive, $w_j^b=\beta$ in the contrary case, where $\beta$, $\chi$ are reals numbers verifying $0<\beta\square\chi\le 1$.

According to a second embodiment, the cellular network is confronted with a plurality of tasks $T=\{T^{(1)}, T^{(2)}, \ldots, T^{(N)}\}$, each task being defined by a set of services requested by the various UEs $T^{(n)}=\{T_1^{(n)}, T_2^{(n)}, \ldots, T_{N_u}^{(n)}\}$ where $T_j^{(n)}$ represents a service requested by the user equipment $u_j$ in the task $T^{(n)}$, each task $T^{(n)}$ defining a class of environment for all the users. The agent associated with a user equipment $u_j$ predicts the action values of the various possible actions via a recurrent neural network, called student network, trained for a learning period on the respective predictions of a plurality of recurrent neural networks, called master networks, each master network being associated with a task of the network and itself trained on a set of experiments $e_j(t)=(o_j(t),a_j(t),r_j(t),o_j(t+1))$ carried out in the context of this task, an experiment being defined as a quadruplet consisting of the observation vector $o_j(t)$ at the given time t, the action $a_j(t)$ selected by the agent at this time, the reward received from the controller after this action, and an observation vector, $o_j(t+1)$, at the following time, the experiments carried out in the context of a task $T^{(n)}$ being stored in a local memory $M_j^{(n)}$ of the user equipment $u_j$.

Advantageously, at the end of the training of each master network, the latter predicts the action values $Q_j(o_j(t)|\theta_j^{(n)*})$ for the action vectors coming from the experiments carried out in the context of the task associated with this master network, said predictions of action value being stored with the corresponding observation vectors, in a memory common to all the tasks, noted as $SM_j$, and after all the master networks have been trained, the student network is trained in a supervised manner on the training data $o_j(t)$, $Q_j(o_j(t)\theta_j^{(n)*}))$, $o_j(t)$ being the input vector of the student network and $Q_j(o_j(t)\theta_{1,j}^*)$ being the associated tag.

BRIEF DESCRIPTION OF THE DRAWINGS

Other features and advantages of the invention will appear upon reading a preferred embodiment of the invention, described in reference to the appended drawings among which.

DETAILED DISCLOSURE OF SPECIFIC EMBODIMENTS

Below, a cellular network composed of a plurality of base stations will be considered. Without losing generality and for illustrative purposes only, it will be supposed that this cellular network is heterogeneous, that is to say that it results from the superposition of a layer of small cells (SBS) having low coverage but potentially capable of providing each UE with a high bandwidth with a layer of macrocells (MBS) guaranteeing the continuity of the coverage of the network by providing a greater range. A typical example of a use is that of a 5G network in which the SBS cells operate in the millimeter band and the MBS cells operate in the sub-6 GHz band.

Figure 1:
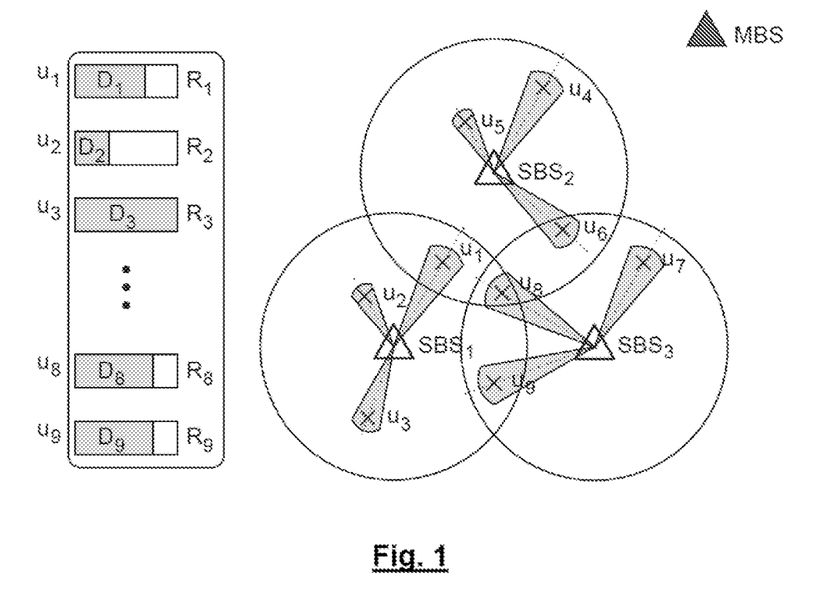
FIG. 1 schematically shows a situation of association of user equipment with base stations in a heterogeneous network.

FIG. 1 shows an example of association of a user equipment (UE) with base stations in such a heterogeneous network.

$u_1, \ldots, u_8$ denotes the UEs (for example mobile terminals), $SBS_1$, $SBS_2$, $SBS_3$ the base stations of three small cells and MBS the base station of a macrocell.

At a given time t, each user equipment $u_j$ requires a certain bandwidth $D_j(t)$ to satisfy a quality of service (QoS) constraint. If this terminal is associated with a base station $BS_i$ ($BS_0$ conventionally denotes the MBS station and $BS_i$, i=1, ..., $N_s$ the $N_s$ SBS base stations), the channel between the user equipment and the associated base station must provide a capacity $R_{ij}=B_{ij} \log(1+SNR_{ij})$ such that $R_{ij} \geq D_j$ where $B_{ij}$ and $SNR_{ij}$ are respectively the bandwidth and the signal-to-interference-plus-noise ratio relative to the channel. The interference to take into account here is the interference caused by the other communications inside the same cell (intracellular interference) as well as that caused by the communications of the other cells (intercellular interference).

For each base station $BS_i$, $U_i$ denotes all the user equipment that is located in the coverage of $BS_i$. Thus in the example illustrated, $U_0=\{u_1, \ldots, u_9\}$, $U_1=\{u_1,u_2,u_3,u_8,u_9\}$, $U_2=\{u_1,u_4,u_5,u_6,u_8\}$ and $U_3=\{u_6,u_7,u_8,u_9\}$. Reciprocally, for a given user equipment $u_j$, $S_j$ denotes the set of base stations capable of serving it. Thus, in the example illustrated $S_1=\{BS_0,BS_1,BS_2\}$, $S_5=\{BS_0,BS_2\}$, and $S_8=\{BS_0, BS_1, BS_2, BS_3\}$.

It is sought to associate the user equipment with the base stations in such a way as to maximize a utility function, U(t), for the entire network while respecting a certain number of constraints relating to the transmission resources available to the base stations. If $x_{ij}=1$ indicates the association of the user equipment $u_j$ with the base station $BS_i$ and $x_{ij}=0$ the absence of an association, and if it is supposed that a user equipment can only be associated with a single base station, the association sought is obtained by solving the optimization problem:

$$\max_{x_{ij}} U(t) \tag{1-1}$$

while respecting the constraints:

$$x_{ij} = \{0, 1\} \tag{1-2}$$

$$\sum_{u_j \in U_i} x_{ij} \leq N_i, \forall BS_i, i = 0, \ldots, N_s \tag{1-3}$$

$$\sum_{BS_i \in S_j} x_{ij} = 1, \forall u_j, j = 1, \ldots, N_u \tag{1-4}$$

where $N_i$ is the number of transmission resources available (for example the number of distinct beams) to the base station $BS_i$, $N_s$ is the number of SBSs and $N_u$ is the number of UEs. The constraint (1-3) simply translates the fact that the UEs can only be served by a base station up to the limit of transmission resources that it has available, the constraint (1-4) that each UE must be served by a base station. In practice, since the quantity of resources of the MBS base station ($BS_0$) is substantially greater than that of the SBS base stations ($BS_i$, i=1, ..., Ns), the constraint is almost always satisfied for i=0. Ideally, the request for bandwidth of the various users must be respected and in this case:

$$D_j \leq \sum_{BS_i \in S_j} x_{ij} R_{ij} \tag{1-5}$$

The utility function of the network can be chosen as the total capacity that can be provided to the various users, or:

$$U(t) = \sum_{i,j} x_{ij} R_{ij} \tag{2-1}$$

if necessary, while taking into account the bandwidth requests of the users:

$$U(t) = \sum_{i,j} x_{ij} \min(D_j, R_{ij}) \tag{2-2}$$

or even while respecting a proportional fairness among the various users:

$$U(t) = \sum_{i,j} x_{ij} \log_2(R_{ij}) \tag{2-3}$$

Other utility functions of the network are possible for a person skilled in the art (for example while taking into account the xMBB, uMTC and mMTC types of service requested by the various users). In general, the utility function of the network is representative of a quality of service provided to the users of the network, in particular in terms of capacity and/or latency.

The idea on which the invention is based is to use a multi-agent reinforcement learning or MARL algorithm, each user equipment (UE) independently learning its optimal association according to the observations of its environment and the action carried out (association request) on the basis of a reward common to all the users.

Each user equipment $u_j$ has partial knowledge of the state of its environment at the time t $s_j(t)$ via an observation. As the observation at the time t, the vector defined by the following will advantageously be chosen:

$$o_j(t)=(a_j(t-1),ACK_j(t-1),RSSI_j(t),D_j(t),R_j(t-1),R(t-1))^T \tag{3}$$

where $a_j(t-1)$ is the action carried out by the user $u_j$ at the previous time, $ACK_j(t-1)$ is the response to the association request, sent back by the base station to which it was transmitted (for example $ACK_j(t-1)=1$ if the association is accepted $ACK_j(t-1)=0$ if the association is denied), $RSSI_j(t)$ is the measurement at the time t of the power received from the base station with which the mobile terminal (UE) associated, $D_j(t)$ is the bandwidth requested by the mobile terminal at the time t, $R_j(t-1)$ is an estimation of the channel capacity of the downlink at the preceding time t−1 (in other words $R_j(t-1)=B_{ij}(t-1)\log_2(1+SNR_{ij}(t-1))$ where $B_{ij}(t-1)$ and $SNR_{ij}(t-1)$ are respectively the bandwidth and the signal-to-interference-plus-noise ratio at the preceding time, (t−1) and R(t−1) is the total capacity of the network obtained at the preceding time t−1, calculated for all the users, in other words $$R(t-1) = \sum_{i=1}^{Ns} \sum_{j=1}^{Nu} x_{ij} R_{ij}(t-1)).$$

It should be noted that certain components of the observation vector $o_j(t)$ are optional. Thus for example if it is not necessary to take into account the current bandwidth request of the user (service corresponding to a Best Effort category) the component $D_j(t)$ can be omitted.

The observation $o_j(t)$ of the environment is qualified as partial insofar as it is non-exhaustive. An exhaustive observation of the environment would suppose in particular that the measurements of RSSI, the estimations of channel capacity, etc. carried out by the other users are communicated to the user $u_j$ via messages.

The action of a user equipment at the time t is defined by the association request of this user, or $a_j(t)=i$ where $BS_i \in S_j$. This action is decided by the user according to a strategy $\pi_j$ which will be described in detail below.

After the agent associated with the user $u_j$ has observed the vector $o_j(t)$ and carried out the action $a_j(t)$ (that is to say has requested an association with a base station), said agent receives a reward r(t) that is not specific to the equipment of the user in question but common to all of the users. More precisely, said reward is advantageously defined by:

$$r(t) = 0 \text{ if } \exists BS_i \text{ such that } \sum_{u_j \in U_i} x_{ij} > N_i \quad (4\text{-}1)$$

$$r(t) = U(t) \text{ otherwise} \quad (4\text{-}2)$$

In other words, if the requests of all the users cannot be conjointly satisfied, the reward obtained is zero and otherwise the reward is given by the value of the utility function of the network at the time considered.

The pieces of user equipment thus independently learn a strategy (policy) that allows them to maximize the sum of rewards over time, each reward being assigned an update factor γ determining the weight of the future rewards in the choice of the action at the time t. In practice, for a sequence (or episode) having a finite duration T, each user equipment $u_j$ follows a strategy (or policy) $\pi_j$ to maximize at each time t:

$$G_j(t) = \sum_{\tau=1}^{T} \gamma^{\tau-1} r_j(t+\tau) \quad (5)$$

where $r_j(t)=r(t)$ is the reward of the user equipment $u_j$, equal to the common reward.

The strategy $\pi_j$ of a user equipment $u_j$ is determined on the basis of the experiments that it records over time. An experiment of the user $u_j$ at the time t is defined as the quadruplet:

$$e_j(t)=(o_j(t),a_j(t),r_j(t),o_j(t+1)) \quad (6)$$

In other words, an experiment involves, on the basis of a given observation of the environment and a given action of the agent, recording the reward obtained and the new observation of the environment.

An episode is represented by a sequence of successive experiments $e_j(t)$, t=1, ..., T. The successive experiments of an episode are stored in a local memory $M_j$ of the UE $u_j$.

On the basis of the experiments that it has recorded, each agent updates its strategy $\pi_j$. This update takes place in a calibration phase (offline update), if necessary by simulation, and can be later continued in an operational phase (online update) when the UE effectively transmits association requests to the base stations of the network.

Figure 2:
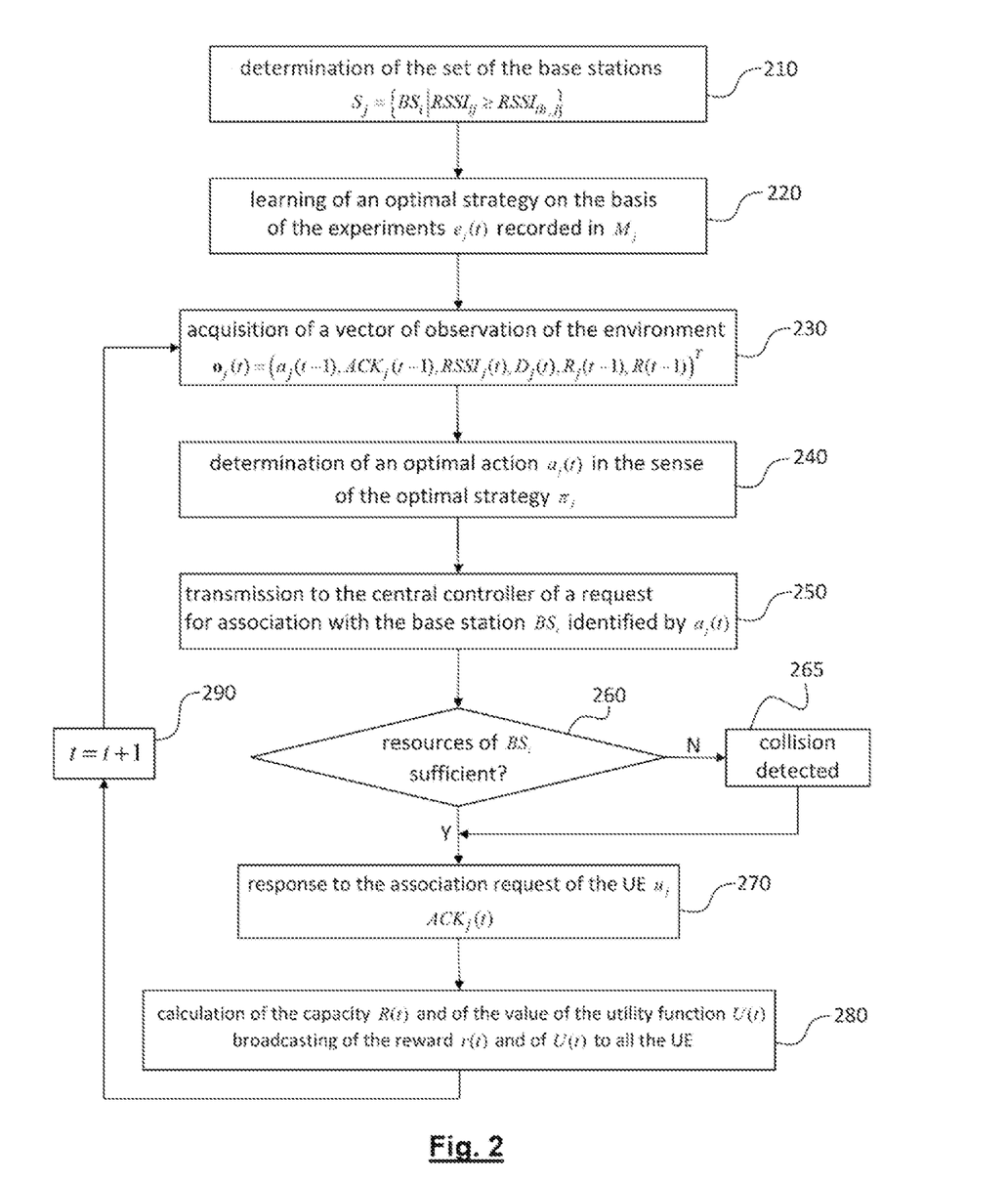
FIG. 2 shows a flowchart of an association method using a multi-agent reinforcement learning method according to a first embodiment of the present invention.

FIG. 2 shows a flowchart of an association method using a reinforcement learning method according to a first embodiment of the present invention.

The association method shown relates to a user equipment (UE) $u_j$, acting as an agent in a MARL reinforcement learning method.

The association method comprises an initialization phase and an operational phase. The initialization phase comprises the steps 210-220.

In step 210, the user equipment $u_j$ determines the set $S_j$ of the base stations with which it is capable of being associated, in other words the set of base stations for which it is in the coverage area. This set can for example be determined by comparing the respective power levels of the signals received from the various base stations and by comparing them to a predetermined threshold value:

$$S_j = \{BS_i | RSSI_{ij} \geq RSSI_{th,j}\} \quad (7)$$

where $RSSI_{ij}$ represents the power level of the signal received by the UE $u_j$ from the base station $BS_i$ and $RSSI_{th,j}$, is a threshold level. This threshold level can for example depend on a quality of service $QoS_j$ requested by the user.

According to a first alternative, the set $S_j$ is determined on the basis of the position of the user and of the neighboring base stations:

$$S_j = \{BS_i | d_{ij} \leq CR_i\} \quad (8)$$

where $d_{ij}$ is the distance from the user equipment $u_j$ to the base station $BS_i$.

According to a second alternative, the set $S_j$ can be directly provided in the form of a list of base stations transmitted to $u_j$ (in the case of a 5G network, this list can be transmitted by the base station of the macrocell).

In step 220, the UE $u_j$ learns a strategy $\pi_j$. To do this, it records in its memory $M_j$ the experiments of a plurality of episodes then determines an optimal strategy on the basis of the experiments recorded. The experiments $e_j(t)$ can be simulated, in which case the UE will have available a strategy (pre-stored in memory or downloaded from a server during the admission into the network), in other words a function $\pi_j^0$ associating with any state $s_j(t)$ (or with any observation $o_j(t)$ of this state) an action $a_j(t)$. The manner in which the strategy $\pi_j$ is obtained on the basis of the experiments $e_j(t)$ is described in detail below.

The initialization phase is followed by an operational phase represented by an iterative loop, an iteration being carried out at each discrete time t.

At each time t, the agent relative to the UE $u_j$ takes into account an observation $o_j(t)$ of its environment $s_j(t)$ to decide on an action $a_j(t)$.

The agent obtains an observation $o_j(t)$ of its environment in step 230.

This observation comprises the association request transmitted by the UE at the preceding time (and consequently the identifier of the base station to which it was sent) as well as the response of the base station. Thus, the UE knows if its association request was granted by the base station in question.

The observation further comprises the data bandwidth observed by the user on the downlink, as well as the value of the utility function for the entire network, calculated by a central controller, housed for example by the base station of the macrocell (MBS) or by a server. The result of the calculation is broadcast to all the users. The controller can for example be created by a dedicated software application, a processor or a DSP.

The observation can also comprise a measurement $RSSI_j(t)$ of the power of the signal received by the current base station with which the UE $u_j$ is associated, as well as the data bandwidth requested, $D_j(t)$.

The measurement of power $RSSI_j(t)$ allows to also calculate the ratio $SNR_{ij}(t)$ for the following iteration.

On the basis of the observation $o_j(t)$, the agent of the UE $u_j$ determines in 240 the optimal action in the sense of the strategy $\pi_j$. The object of this strategy is to maximize the expected value of the sum of the future rewards, weighted by their respective update factors:

$$a_j(t) = \underset{a, \pi_j}{\mathrm{argmax}}\, E(G_j(t)) \qquad (9)$$

In practice, the strategy used $\pi_j$ can be a greedy or ε-greedy strategy based on the action values as described below.

On the basis of the action selected $a_j(t)$, the UE deduces the base station $BS_i \in S_j$ with which it desires to be associated. The identifier of the base station in question is transmitted in 250 to the central controller, for example to the MBS station in the case of a 5G network. It is further possible that in the case in which none of the base stations $BS_i$ of $S_j$ are selected, the user requests an association with the MBS base station. The controller then relays the association request to the corresponding base station $BS_i$.

In 260, the base station $BS_i$ determines whether it has available sufficient transmission resources to serve all the users that requested an association with it. It alerts the controller of this via the response $ACK_j(t)$.

If the response is negative ($ACK_j(t)=0$) for one of the base stations, a collision is detected in 265. Moreover, in the case of a 5G network, the MBS base station thus grants the association to the user equipment $u_j$. In other words, the association with the MBS base station constitutes a backup solution in the case of refusal of the base station $BS_i$.

In all the cases, the controller or the base station $BS_i$ itself alerts the user equipment $u_j$ of the association or not in 270 by the response $ACK_j(t)$.

In 280, the controller calculates the total capacity R(t) on the basis of the capacities $R_j(t)$, j=1, ..., $N_u$, of all the downlinks. The value of the utility function U(t) is also calculated, if necessary while taking into account the data bandwidths $D_j(t)$ j=1, ..., $N_u$, requested by the various users and previously transmitted by the latter to the controller.

The controller then broadcasts the total capacity R(t) as well as a common reward r(t) for all the agents. The latter is zero if a collision is detected and equal to the value of the utility function U(t) otherwise.

Then the acquisition of a new observation vector is returned to in 290.

Figure 3:
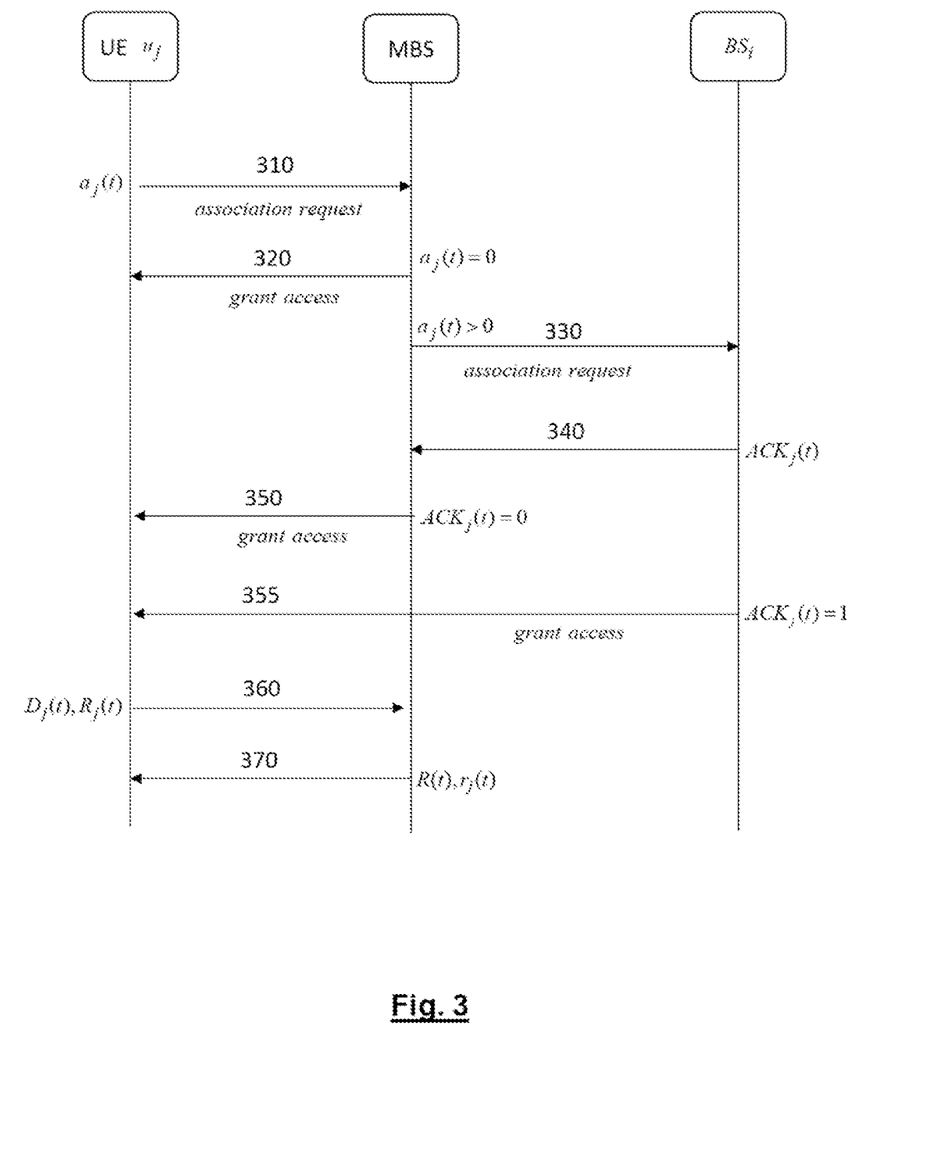
FIG. 3 schematically shows the exchanges of messages between various elements of a heterogeneous network for the implementation of the association method of FIG. 2.

FIG. 3 schematically shows the exchanges of messages between various elements of a heterogeneous network, more particularly of a 5G network, during the implementation of the association method according to FIG. 2.

The drawing shows the user equipment (UE), $u_j$, the central controller for example here the base station of the macrocell where the user is located, MBS, and the base station of the small cell, $BS_i$, from which the user equipment $u_j$ requests an association. The base station $BS_i$ is part of the set $S_j$ of the neighboring base stations.

In step 310, the user equipment $u_j$ transmits to the base station MBS the action $a_j(t)$, in other words the identifier of the base station from which this user equipment has decided to request an association.

If $a_j(t)=0$, the base station MBS automatically grants it the association in 320 and the downlink with $u_j$ is established.

If $a_j(t)>0$, the base station MBS transfers in 330 the association request to the base station $BS_i$ corresponding to the identifier.

The base station $BS_{a(j)}$ returns the response $ACK_j(t)$ to the base station MBS in 340.

If $ACK_j(t)=0$, the base station MBS grants the association and establishes a downlink with $u_j$ in 350.

However, if $ACK_j(t)=1$, the base station $BS_{a(j)}$ grants the association and establishes a downlink with $u_j$ in 355.

The user equipment $u_j$ determines the bandwidth $D_j(t)$, required by the quality of service, and measures the capacity $R_j(t)B_{a(j),j}$ log $(1+SINR_{a(i),j})$ of the downlink previously established with $BS_{a(j)}$. The signal-to-interference-plus-noise ratio $SINR_{a(i),j}$ on this link can be estimated on the basis of pilot symbols for example. The required bandwidth $D_j(t)$ and the capacity $R_j(t)$ are transmitted to the base station MBS in 360.

According to one alternative, this information is aggregated at the base station $BS_{a(j)}$ then transmitted to the base station MBS. In particular, the base station $BS_{a(j)}$ can provide the sum of the capacities at its small cell and transmit it to the base station MBS.

The base station MBS calculates the overall capacity R(t) on the basis of the capacities $R_j(t)$, j=1, ..., $N_u$ relative to the various downlinks (or the capacities aggregated at the base stations according to the above alternative) as well as the reward r(t).

It then broadcasts this information to all of the UEs, in particular to the UE $u_j$ in 370.

Hereinafter, for reasons of uniformity of notation, $r_j(t)$ denotes the common reward received by the UE $u_j$.

It has been shown above that the agent associated with a UE $u_j$ determined at each time t its action $a_j(t)$ (in other words the base station with which the UE sought to be associated) on the basis of the observation $o_j(t)$ and the strategy $\pi_j$, the observation $o_j(t)$ translating the knowledge of the state of the environment of the agent associated with the UE $u_j$. A plurality of reinforcement learning methods exists in the literature, such as the SARSA method or the "Q-learning" method. A description of the SARSA and Q-learning reinforcement learning methods can be found in the work by Richard S. Sutton and Andrew G. Barto entitled "Reinforcement learning", $2^{nd}$ edition, 2018, pp. 129-132.

According to the SARSA and Q-learning learning methods, the strategy $\pi_j$ of the UE $u_j$ is obtained by an iterative update on the various episodes, on the basis of a function of evaluation of action (state-action-value function) Q(s,a) trained on each episode, or for the SARSA learning method:

$$Q(s,a) \leftarrow (1-\alpha)Q(s,a)+\alpha(r+\gamma Q(s',a')) \qquad (10\text{-}1)$$

and, for the Q-learning learning method:

$$Q(s, a) \leftarrow (1-\alpha)Q(s, a) + \alpha\left(r + \gamma \max_{a'} Q(s', a')\right) \quad (10\text{-}2)$$

where $0<\alpha\leq1$ is the learning rate and $0<\gamma\leq1$ is the update factor. s and s' respectively represent the current and future state of the environment, a and a' respectively represent the action of the agent on the environment in the state s and s', and r is the reward obtained from the environment after carrying out the action a in the state s. The update is carried out by selecting for each state s an action a according, for example, to a strategy of the E-greedy type based on the values Q(s,a) recorded, then by updating these values on the basis of the reward obtained and the value of the function of evaluation of action in the following state s', or according to the current strategy (for the SARSA learning method), or according to the maximum of the evaluation function in the following state.

The algorithms such as Q-Learning and SARSA known from the prior art can consequently be applied to estimate $Q(o_j(t), a_j(t))$.

Figure 4:
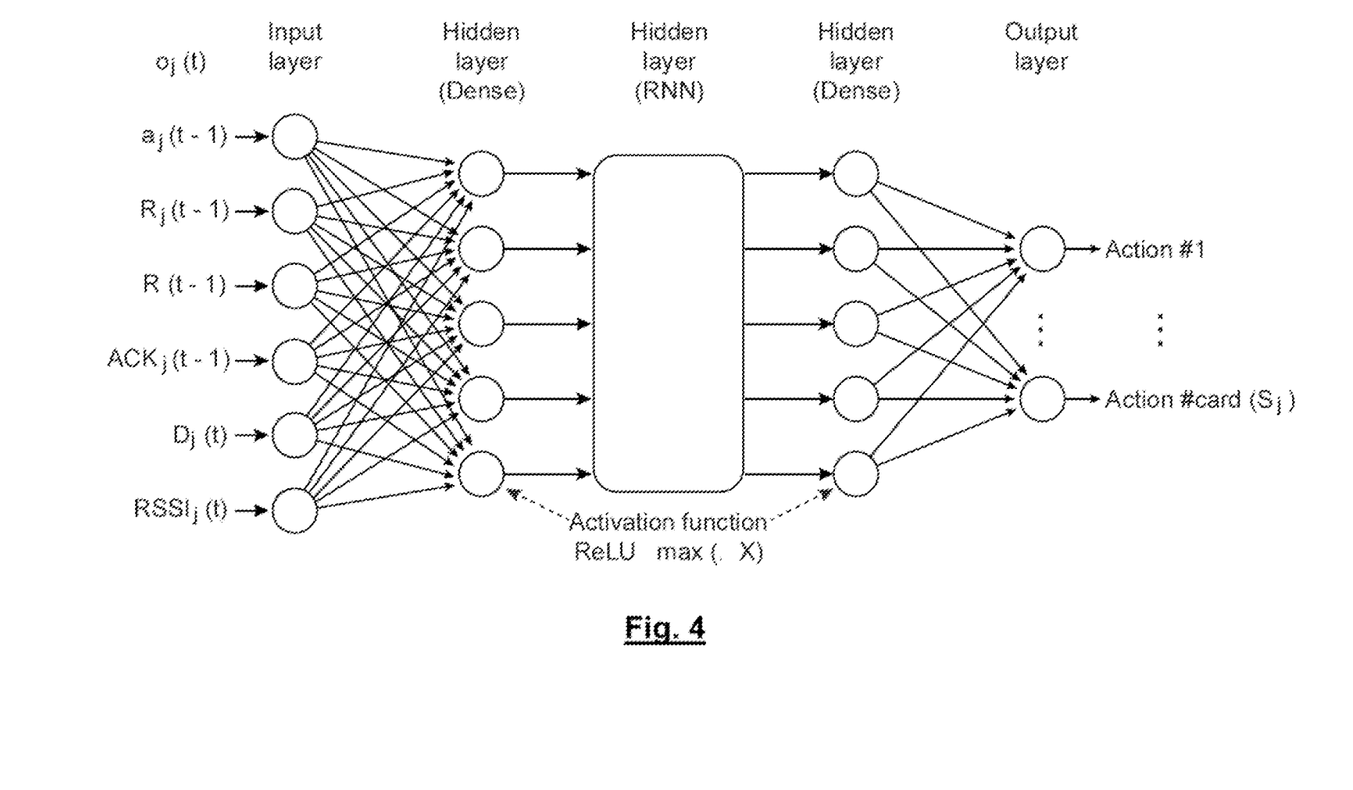
FIG. 4 schematically shows a recurrent artificial neural network (DRQN) used to approximate the function of action value in the method of FIG. 2.

In the present case, because of the complexity of the 5G system, the function of evaluation of action according to the Q-learning learning method is approximated by a recurrent artificial neural network, also called DRQN (Deep Recurrent Q Network), shown in FIG. 4.

This DRQN network includes an input layer receiving at the time t the observation vector $o_j(t)$, in other words the request emitted at the previous time, $a_j(t-1)$, the response to this request $ACK_j(t-1)$ received from the base station $BS_{a(j)}$, the capacity of the downlink $R_j(t-1)$ of this base station as well as the total capacity of the network calculated over all the downlinks of the users, $R(t-1)$. Optionally, the input layer further receives the measurement of the power level of the signal received from the base station $BS_{a(j)}$, as well as the data bandwidth requested by the user equipment $u_j$.

The input layer is followed by a first plurality of densely connected hidden layers or MLP (Multilayer Perceptron).

The output layer provides a size vector $J=Card(S_j)$ giving for each base station $BS_i \in S_j$ a value of the action function corresponding to the choice of this base station for the association. In practice, the number of neurons of the output layer is limited to a predetermined value $J_{max}$, a parameter of the network corresponding to the greatest number of cells of the network from which the user can receive the pilot signals at the same time. The output layer is preceded by a second plurality of densely connected hidden layers (or MLP).

The neurons of the first and second perceptrons can use an activation function of the linear rectification type (ReLU) in a manner known per se.

A layer of recurrent neural network (RNN), for example a network of the LSTM (Long Short-Term Memory) type known from the prior art, is interposed between the first and the second perceptron. Such an LSTM neural network has the particularity of not being conventionally feed forward but having feedback connections allowing it to learn on sequences as well as forget gates allowing to specify the temporal horizon of the learning.

Once trained (for example via simulation or offline), the neural network provides, on the basis of the observation vector $o_j(t)$, an estimation of the action value $Q(o_j(t),a)$ for each possible action a (in other words for each base station $BS_i \in S_j$ with which the user equipment $u_j$ is capable of being associated).

In fact, the recurrent network comprises an internal register allowing the feedback. It can be considered as a state machine, the (hidden) state of the machine at the time t being represented by the contents of this register, noted as $h_j(t)$, a vector having a dimension equal to the size of the register. Moreover, it is supposed that the synaptic coefficients of the neural network are represented synthetically in vector form, $\theta_j$. Hereinafter, the notation $Q(o_j(t),a,h_j(t-1)|\theta_j)$ will consequently be adopted to express this dependency of the estimation the vector $h_j(t-1)$ expressing the fact that it is the contents of the register at the preceding time that are involved in the calculation of the action value at the current time.

The DRQN neural network is trained in a supervised manner on episodes that is to say on sequences of experiments $e_j(t)$, $t=1, \ldots, T$, stored in a local memory $M_j$ (or replay buffer) of the UE $u_j$.

The training aims to seek a set of parameters $\theta_j$ minimizing the expected value of the loss function over the set $M_j$, of the experiments:

$$L_j(\theta_j) = E_{e_j(t) \square M_j}([y_j(t) - Q(o_j(t), a_j(t), h_j(t-1)|\theta_j)]^2) \quad (11)$$

where $E_{e_j(t) \square M_j}$ means that the expected value is taken over the set $M_j$, and where $o_j(t), a_j(t)$ come from the experiment $e_j(t)$, $1 \leq t < T$ and where:

$$y_j(t) = r_j(t) + \gamma \max_{a'} Q(o_j(t+1), a', h_j(t)|\hat{\theta}_j) \quad (12)$$

where $y_j(t)$ represents the target of the action value to be reached by the neural network, and $\hat{\theta}_j$ represents the set of parameters last estimated via the stochastic gradient algorithm (SGD).

This action value target to be reached is none other than the greatest sum of the updated rewards that the agent can receive, given the observation $o_j(t)$ and the action $a_j(t)$ drawn from the experiment $e_j(t)$. It is understood in effect from the equation (12) that this value is the sum of the reward $r_j(t)$ following the action $a_j(t)$ and of the maximum action value calculated at the following time affected by the update coefficient $\gamma$ (that is to say of the maximum of the updated future rewards at the following time).

As a general rule, the calculation of the gradient of the loss function is not carried out on the set $M_j$ of the experiments (the learning set) but on a mini-batch $B_j \subset M_j$ of such experiments, for this reason noted as $e_j^b(t)$.

The loss function:

$$L_j(\theta_j) = E_{e_j^b(t) \square B_j}([y_j^b(t) - Q(o_j^b(t), a_j^b(t), h_j^b(t-1)|\theta_j)]^2) \quad (13)$$

is thus minimized on the mini-batch where $E_{e_j^b(t) \square B_j}[\bullet]$ means that the expected value is taken over all of the experiments of the mini-batch $B_j$. The values with b as a superscript index are relative to the mini-batch and not to the entire set $M_j$. In particular:

$$y_j^b(t) = r_j^b(t) + \gamma \max_{a'} Q(o_j^b(t+1), a', h_j^b(t)|\hat{\theta}_j) \quad (14)$$

It is noted that the expression in brackets in the expression (11) or (13) is known as the TD error of the function of evaluation of action value, respectively noted as $\delta_j$ and $\delta_j^b$. The expressions (11) and (13) of the loss functions thus become:

$$L_j(\theta_j) = E_{e_j(t) \square M_j}([\delta_j(t)]^2) \quad (15\text{-}1)$$

and, in the case of processing by mini-batch:

$$L_j(\theta_j) = E_{e_j^b(t) \square B_j}([\delta_j^b(t)]^2) \quad (15\text{-}2)$$

In the case of distributed and collaborative learning (for example MARL), the stability of the learning can be improved by favoring learning on the positive TD errors, that is to say those leading to an increase in the action value. To do this, a hysteresis is introduced into the learning by skewing the loss functions:

$$L_j(\theta_j) = E_{a_j(t) \square M_j}([w_j \cdot \delta_j(t)]^2) \quad (16\text{-}1)$$

$$L_j(\theta_j) = E_{e_j^b(t) \square B_j}([w_j^b \cdot \delta_j^b(t)]^2) \quad (16\text{-}2)$$

with $w_j = \chi$ (and respectively $w_j^b = \chi$) if $\delta_j(t) \geq 0$ (and respectively $\delta_j^b(t) \geq 0$) and $w_j = \beta$ (and respectively $w_j^b = \beta$) in the contrary case, with $0 < \beta \square \chi \leq 1$. In other words, if the TD error is positive, the learning rate is $\chi$ and if the TD error is negative, the learning rate is $\beta$.

The learning can be further improved in terms of stability of the set of parameters, by using two neural networks, a first DRQN network for the optimization of the set of parameters and a second DRQN network, called target network, having the same structure as the first, for the calculation of the target of the action value $y_j^b(t)$, as proposed in the article by V. Mnih et al. entitled "Human-level control through deep reinforcement learning", 26 Feb. 2015, vol. 158, pp. 529-541 and illustrated in FIG. 5.

Figure 5:
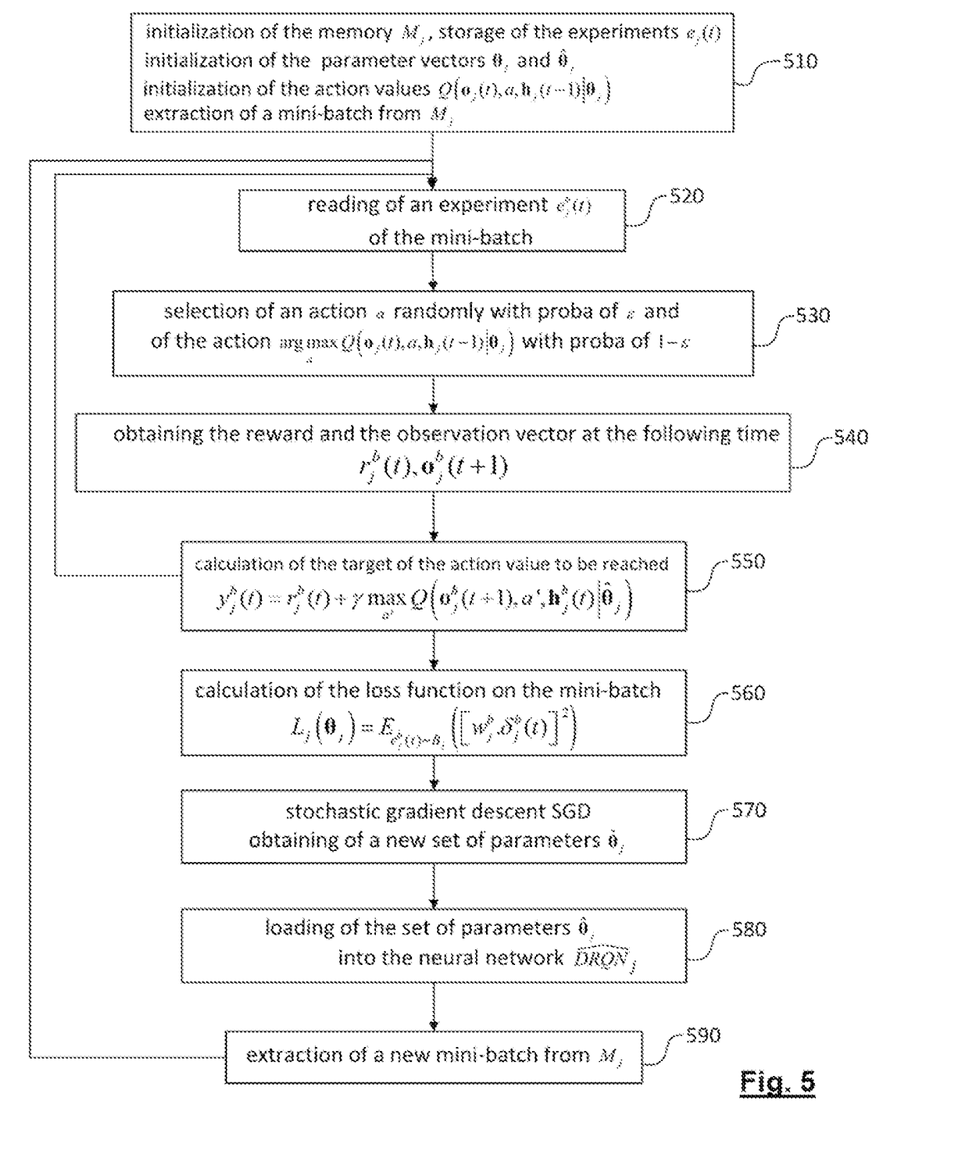
FIG. 5 shows a flowchart of a method for training the artificial neural network of FIG. 4.

FIG. 5 shows a flowchart of a learning method of the neural network of FIG. 4.

Hereinafter DRQN$_j$ denotes the neural network dedicated to the optimization of the set of parameters and $\widehat{D}$RQN$_j$ the one in charge of the calculation of the target of the action value for the UE $u_j$. In the same way, the values relative to the network $\widehat{D}$RQN$_j$ have a circumflex accent. The networks DRQN$_j$ and $\widehat{D}$RQN$_j$ have identical structures and only differ by their respective sets of parameters.

In step 510, the memory $M_j$ (replay buffer) is initialized via the experiments $e_j(t)$ belonging to a plurality of episodes. The respective sets of parameters $\theta_j$, and $\hat{\theta}_j$ of the networks DRQN$_j$ and $\widehat{D}$RQN$_j$ as well as the action values $Q(o_j(t),a,h_j(t-1)|\theta_j)$ and $Q(o_j(t),a,h_j(t-1)|\hat{\theta}_j)$ are also initialized. A first mini-batch is then extracted from the memory $M_j$.

To accelerate the convergence of the learning, the initial sets of parameters and/or the initial action values can be obtained by simulation and preloaded into the memory of the user equipment or be downloaded from a server of the network during the admission of the user into the network.

In 520 an iterative loop on the experiments $e_j^b(t)$ of the mini-batch is then entered, each iteration corresponding to such an experiment.

In step 530, an action a is chosen, for example through a strategy of the $\varepsilon$-greedy type, that is to say in a random manner with a probability $\varepsilon$ and otherwise the action $$\mathop{\mathrm{argmax}}_{a} Q(o_j(t), a, h_j(t-1)|\theta_j)$$

with a probability 1-$\varepsilon$.

In step 540, the reward $r_j^b(t)$ and the following observation $o_j^b(t+1)$ are sought in the recording $e_j^b(t)=(o_j^b(t),a,r_j^b(t),o_j^b(t+1))$.

In step 550, the target of the action value to be reached by the expression (17) is calculated, or $$y_j^b(t) = r_j^b(t) + \gamma \max_{a'} Q(o_j^b(t+1), a', h_j^b(t)|\hat{\theta}_j).$$

In step 560, after processing of all the experiments of the mini-batch, the loss function (17-1) or (18-2) of the network DRQN$_j$ is calculated on the basis of the quadratic differences $(y_j^b(t) - Q(o_j^b(t),a_j^b(t),h_j^b(t-1)|\theta_j)^2)$ relative to the various experiments of the mini-batch.

In 570, a stochastic gradient descent is carried out with respect to the parameters $\theta_j$ on the experiments of the mini-batch and the new set of parameters $\hat{\theta}_j$ is deduced.

In 580, the new set of parameters $\hat{\theta}_j$ is loaded into the network $\widehat{D}$RQN$_j$.

Finally, in 590, a new mini-batch is extracted from the memory $M_j$ and step 520 is returned to.

At the end of the learning method (upon satisfaction of a stop criterion, for example according to the value of the loss function) an optimal set of parameters $\theta_j^*$ is available to estimate the action values.

Once the DRQN network has been trained, the selection of the base station BS$_i$ to request the association is then obtained in the operational phase on the basis of the J outputs of this network via a greedy strategy $\pi_j$ defined by:

$$a_j(t) = \mathop{\mathrm{argmax}}_{a}(Q(o_j(t), a, h_j(t-1)|\theta_j^*)) \quad (17)$$

where $o_j(t)$ and $h_j(t)$ represent here the observation and the hidden state of the DRQN network at the time t of the operational phase. In the expression (19), it is understood that the argument of the maximum is sought among all the possible actions, in this case all the requests for association with base stations BS$_i \in S_j$. This corresponds to seeking, among all the outputs of the neural network, the one that corresponds to the greatest value.

Alternatively, the strategy $\pi_j$ can be $\varepsilon$-greedy, in which case the optimal action is provided by (19) with a probability 1-$\varepsilon$ and chosen randomly from the other possible actions with a probability $\varepsilon$.

The probability $\varepsilon$ can be chosen relatively close to 1 at the start then decrease towards a low value in such a way that the strategy is in the end quasi-deterministic for a given environment.

The learning method can be carried out offline and if necessary be completed online by continuing to store experiments $e_j(t)$ during the operational phase to take into account variations in the environment.

Alternatively to the learning method disclosed above, it is possible in step 580 for the new set of parameters to only be loaded every K iterations, in other words every K experiments.

The association method described above in relation to FIG. 2, in particular when the action value is estimated using a DRQN network such as that of FIG. 4, allows to obtain good flexibility when the network evolves over time, for example when new users are admitted or leave the network or when their requests in terms of quality of service vary. This flexibility is obtained when the learning of the DRQN network is carried out online, the synaptic coefficients as well as the hidden states of the networks DRQN$_j$, j=1, ..., $N_u$ thus changing over time.

However, this flexibility can be further improved by adopting an association method according to a second embodiment of the invention.

It is supposed in this embodiment that the network is confronted with N different tasks. A task can correspond to an $N_u$-tuple of services for the various users. For example, in a 5G network, the service requested by a user at a given time can be of the xMBB, URLLC or mMTC type. A service requested by a user is defined by a set of quality of service constraints relating for example to the bandwidth or the latency on the link with the network. The services requested by a user can in particular vary according to the time and the user's location.

$T^{(n)} = \{T_1^{(n)}, T_2^{(n)}, \ldots, T_{N_u}^{(n)}\}$ denotes a task of the network in which $T_j^{(n)}$ represents a service requested by the user j in this task and $T = \{T^{(1)}, T^{(2)}, \ldots, T^{(N)}\}$ the set of tasks that the network may have to carry out. For example $T_j^{(n)}$ can be the average bandwidth requested by the UE $u_j$ in the task n or the pair consisting of the average bandwidth requested and the position of the user in this task.

Each task of the network constitutes a class of environment for the various users. From the point of view of a user equipment $u_j$, each task manifests itself as a different zone $\Theta_j^{(n)}$ of the space of the parameters of its DRQN network. The environment of the user is supposed to be stationary for a given task.

The second embodiment relies on a policy distillation as described in the article by A. A. Rusu et al. entitled "Policy distillation" published under arXiv:1511.06295v2, 7 Jan. 2016.

Figure 6:
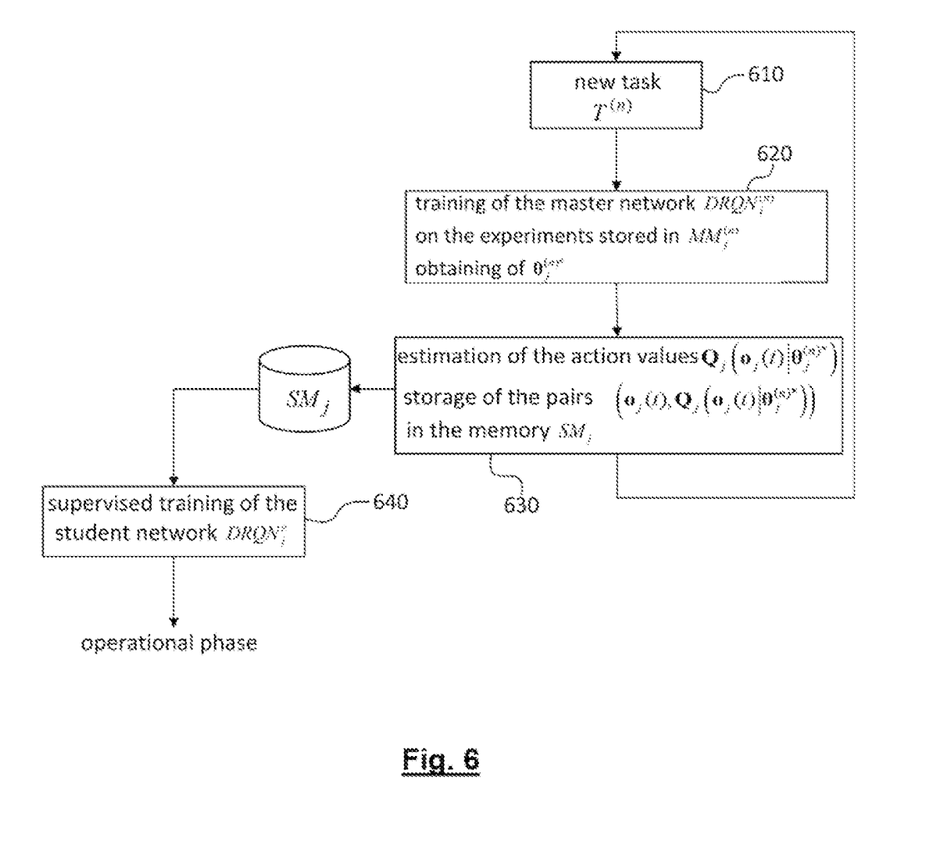
FIG. 6 shows a flowchart of an association method using a multi-agent reinforcement learning method according to a second embodiment of the present invention.

More precisely, FIG. 6 shows a flowchart of an association method using a reinforcement learning method according to a second embodiment of the present invention.

Like in the first embodiment, the association method is executed independently by each use, here the UE $u_j$.

Only the learning part has been shown in the drawing, with it being understood that the operational phase uses the trained DRQN neural network to determine the base station with which the UE requests the association, as described in relation to FIG. 2.

The learning part comprises two phases, respectively corresponding to the right part and the left part of the drawing.

In the first phase, neural networks $DRQN_j^{(n)}$, n=1, ..., N, called master neural networks, having the same structure as described in relation to FIG. 4, are respectively trained on the tasks s $T^{(n)}$, n=1, ..., N. This training on the various tasks can be carried out in a parallel or sequential manner. In the case illustrated, the training is carried out sequentially via an iterative loop, each iteration corresponding to a new task $T^{(n)}$ of T.

For each new task $T^{(n)}$ taken into account in step 610, the master neural network $DRQN_j^{(n)}$ is trained in 620 on the basis of the experiments $e_j(t) = (o_j(t), a_j(t), r_j(t), o_j(t+1))$ carried out in the context of this task, these experiments being read from a memory $MM_j^{(n)}$ in which they were previously stored. The training of the network is carried out as described in relation to FIG. 5, in other words, the neural network $DRQN_j^{(n)}$ is trained in a supervised manner to estimate the action values $Q(o_j(t), a_j(t))$, the result of the training being embodied by an optimal set of parameters $\theta_j^{(n)*}$.

In step 630, the neural network $DRQN_j^{(n)}$ estimates the action values for the observations of the experiments stored in the memory $MM_j^{(n)}$. More precisely, these estimations, $Q(o_j(t), a, h_j(t-1)|\theta_n^{(n)*})$, are carried out for all possible actions a, that is to say for all the base stations $BS_i \in S_j$ from which an association can be requested in the context of this task. For this reason, they are noted as a vector of size $J_{max}$, $Q_j(o_j(t)|\theta_j^{(n)*})$. These estimations are stored in relation to the observation vectors $o_j(t)$, in a memory common to all of the tasks, noted as $SM_j$. At the end of the sequence of learning tasks, the memory $SM_j$ contains pairs $(o_j(t), Q_j(o_j(t)|\theta_j^{(n)*}))$ without the learning task itself being specified.

In the second phase, a neural network $DRQN_j^e$, called student network, potentially having a structure substantially simpler than that of the master networks, $DRQN_j^{(n)}$, in the sense that it has substantially less internal layers than the latter, is trained in 640 on the basis of the learning data stored in the common memory $SM_j$. More precisely, this training is carried out in a supervised manner on the basis of the data $(o_j(t), Q_j(o_j(t)|\theta_j^{(n)*}))$, $o_j(t)$ being an input vector of the network $DRQN_j^e$ and $Q_j(o_j(t)|\theta_{1,j}^*)$ the associated tag. It is therefore understood that the neural network $DRQN_j^e$ is trained on data previously distilled according to the various tasks by the master neural networks.

Once trained, the neural network $DRQN_j^e$ can predict in an operational phase, on the basis of a given observation vector, the action values relative to the various possible actions. Like in the first embodiment, the action corresponding to the greatest action value at the output of the neural network $DRQN_j^e$ is then selected. This action provides the identifier of the base station $BS_i \in S_j$ from which the UE $u_j$ will request the association.

The invention claimed is:

1. A method for associating user equipment with base stations of a cellular network, said association method implementing a multi-agent reinforcement learning method, an agent being associated with each user equipment, wherein:

each user equipment $u_j$ determines a set $S_j$ of base stations in the coverage of each of which it is located;

each agent associated with a user equipment selects, on the basis of a partial observation $(o_j(t))$ of its environment at a given time, an action $(a_j(t))$ out of a plurality of possible actions, each possible action corresponding to a request to associate the user equipment with a base station $(BS_i \in S_j)$ of said set, said action being selected on the basis of a strategy $(\pi_j)$ aiming to maximize an action value calculated as the expected sum of a plurality of future rewards, updated at said given time, the user equipment transmitting to a central controller an association request corresponding to the action thus selected;

each base station determines whether each base station can satisfy all of the association requests received from the user equipment given the transmission resources that each base station has available and in the negative case informs the central controller thereof;

the central controller calculates a reward $(r(t))$, common to the actions of the agents, and broadcasts the reward to all the user equipment, said reward being zero if one of the base stations cannot satisfy all of the association requests received and equal to the value taken by a utility function of the network, representative of the quality of service provided to the user equipment, otherwise.

2. The method for associating user equipment with base stations of a cellular network according to claim 1, wherein the utility function U(t) of the network is equal to the sum of the capacities of the downlinks between the user equipment and the base stations that are associated with it or to the sum of the logarithms of these capacities.

3. The method for associating user equipment with base stations of a cellular network according to claim 1, wherein the utility function of the network is equal to $$U(t) = \sum_{i,j} x_{ij} \min(D_j, R_{ij})$$

where $D_j$ is the bandwidth requested by a user equipment $u_j$ and $R_{ij}$ is the capacity of the downlink between the base station $BS_i$ and the user equipment $u_j$, $x_{ij}=1$ if the base station $BS_i$ is associated with the user equipment $u_j$ and $x_{ij}=1$ otherwise.

4. The method for associating user equipment with base stations of a cellular network according to claim 1, wherein the cellular network is a heterogeneous network consisting of a layer of macrocells and a layer of small cells, and wherein the central controller is located in the base station of a macrocell.

5. The method for associating user equipment with base stations of a cellular network according to claim 1, wherein the agent associated with a user equipment $u_j$ predicts the action values of various possible actions via a recurrent artificial neural network receiving at the input a vector of observation of the environment $o_j(t)$ at a given time and providing at the output a prediction of the action values for the various possible actions corresponding to the base stations of the set $S_j$.

6. The method for associating user equipment with base stations of a cellular network according to claim 5, wherein the neural network comprises an input layer, a first plurality of densely connected layers, an LSTM layer, a second plurality of densely connected layers and an output layer.

7. The method for associating user equipment with base stations of a cellular network according to claim 5, wherein the vector of observation of the environment comprises an action $a_j(t-1)$ carried out by the user equipment $u_j$ at a preceding time; a response $ACK_j(t-1)$ to the association request, sent back by the base station to which it was transmitted; a measurement of power received from the base station at the given time 1, $RSSI_j(t)$; a bandwidth $D_j(t)$ requested by the mobile terminal at the time t, an estimation $R_j(t-1)$ of channel capacity of a downlink at the preceding time $t-1$; an estimation $R(t-1)$ of the sum of the capacities of the downlinks of the user equipment at the preceding time.

8. The method for associating user equipment with base stations of a cellular network according to claim 5, wherein the recurrent neural network is trained on a set of experiments $e_j(t)=(o_j(t),a_j(t),r_j(t),o_j(t+1))$, each experiment belonging to an episode, $\{e_j(t); t=1, \ldots, T\}$, an experiment being defined as a quadruplet consisting of the observation vector $o_j(t)$ at the given time t, the action $a_j(t)$ selected by the agent at said time, the reward received from the controller after said action, and an observation vector, $o_j(t+1)$, at the following time, said experiments being stored in a local memory $M_j$ of the user equipment $u_j$.

9. The method for associating user equipment with base stations of a cellular network according to claim 5, wherein synaptic coefficients of the recurrent neural network are represented by a parameter vector, $\theta_j$, said parameter vector being obtained by a stochastic gradient descent on a loss function averaged by mini-batch $L_j(\theta_j)=E_{e_j^b(t):B_j}([\delta_j^b(t)]^2)$ where $\delta_j^b(t)$ is a TD error in the prediction of action value for an experiment of the mini-batch.

10. The method for associating user equipment with base stations of a cellular network according to claim 5, wherein synaptic coefficients of the recurrent neural network are represented by a parameter vector, $\theta_j$, said parameter vector being obtained by a stochastic gradient descent on a loss function averaged by mini-batch $L_j(\theta_j)=E_{e_j^b(t):B_j}([w_j^b \delta_j^b(t)]^2)$ where $\delta_j^b(t)$ is a TD error in the prediction of action value for an experiment of the mini-batch and $w_j^b=\chi$ if the TD error is positive, $w_j^b=\beta$ in the contrary case, where $\beta$, $\chi$ are reals numbers verifying $0<\beta=\chi \leq 1$.

11. The method for associating user equipment with base stations of a cellular network according to claim 1, wherein the cellular network is confronted with a plurality of tasks $T=\{T^{(1)}, T^{(2)}, \ldots, T^{(N)}\}$, each task being defined by a set of services requested by the various user equipment $T^{(n)}=\{T_1^{(n)}, T_2^{(n)}, \ldots, T_{N_u}^{(n)}\}$ where $T_j^{(n)}$ represents a service requested by the user equipment $u_j$ in the task $T^{(n)}$, each task $T^{(n)}$ defining a class of environment for all the users; and that the agent associated with a user equipment $u_j$ predicts the action values of the various possible actions via a recurrent neural network, called student network, trained for a learning period on the respective predictions of a plurality of recurrent neural networks, called master networks, each master network being associated with a task of the network and itself trained on a set of experiments $e_j(t)=(o_j(t),a_j(t),r_j(t),o_j(t+1))$ carried out in the context of said task, an experiment being defined as a quadruplet consisting of the observation vector $o_j(t)$ at the given time t, the action $a_j(t)$ selected by the agent at said time, the reward received from the controller after said action, and an observation vector, $o_j(t+1)$, at a following time, the experiments carried out in the context of a task $T^{(n)}$ being stored in a local memory $M_j^{(n)}$ of the user equipment $u_j$.

12. The method for associating user equipment with base stations of a cellular network according to claim 11, wherein at the end of the training of each master network, the latter predicts the action values $Q_j(o_j(t)|\theta_{j(n)*})$ for the action vectors coming from the experiments carried out in the context of the task associated with said master network, said predictions of action value being stored with the corresponding observation vectors, in a memory common to all the tasks, noted as $SM_j$, and that after all the master networks have been trained, the student network is trained in a supervised manner on the training data $(o_j(t),Q_j(o_j(t)|\theta_j^{(n)*}))$, $o_j(t)$ being the input vector of the student network and $Q_j(o_j(t)|\theta_{1,j}^*)$ being the associated tag.

* * * * *